United States Patent
Bär

(10) Patent No.: US 6,390,717 B1
(45) Date of Patent: May 21, 2002

(54) LOCKING DEVICE FOR A HEIGHT AND TILT ADJUSTABLE STEERING COLUMN IN A MOTOR VEHICLE

(75) Inventor: Andreas Bär, Bremen (DE)

(73) Assignee: Nacam Deutschland GmbH (DE)

( * ) Notice: Subject to any disclaimer, the term of this patent is extended or adjusted under 35 U.S.C. 154(b) by 0 days.

(21) Appl. No.: 09/581,302

(22) PCT Filed: Oct. 4, 1999

(86) PCT No.: PCT/DE99/03205

§ 371 Date: Aug. 2, 2000

§ 102(e) Date: Aug. 2, 2000

(87) PCT Pub. No.: WO00/21820

PCT Pub. Date: Apr. 20, 2000

(30) Foreign Application Priority Data

Oct. 8, 1998 (DE) ......................................... 198 46 292

(51) Int. Cl.[7] .............................. F16B 5/00; B62D 1/19
(52) U.S. Cl. .................................. 403/104; 403/DIG. 1; 74/493; 280/775
(58) Field of Search ............................. 403/104, 105, 403/110, 373, DIG. 1; 74/493, 492; 280/775, 777

(56) References Cited

U.S. PATENT DOCUMENTS

| | | | | |
|---|---|---|---|---|
| 4,732,050 A | * | 3/1988 | Vollmer | 74/493 |
| 5,009,120 A | * | 4/1991 | Iseler et al. | 74/493 |
| 5,338,064 A | * | 8/1994 | Sadakata et al. | 280/775 |
| 5,595,399 A | * | 1/1997 | Fouquet et al. | 280/777 |
| 5,743,150 A | * | 4/1998 | Fevre et al. | 74/493 |
| 5,769,455 A | * | 6/1998 | Duval et al. | 280/777 |
| 5,787,759 A | * | 8/1998 | Olgren | 74/493 |
| 5,813,699 A | * | 9/1998 | Donner et al. | 280/775 |
| 5,893,676 A | * | 4/1999 | Yamamoto et al. | 74/493 X |
| 5,960,673 A | * | 10/1999 | Eaton et al. | 74/492 |
| 6,092,955 A | * | 7/2000 | Chartrain et al. | 403/104 X |
| 6,092,957 A | * | 7/2000 | Fevre et al. | 403/373 |
| 6,131,481 A | * | 10/2000 | Wilson et al. | 74/493 |

FOREIGN PATENT DOCUMENTS

DE 198 05 289 A1 8/1998

* cited by examiner

*Primary Examiner*—Harry C. Kim
(74) *Attorney, Agent, or Firm*—McGlew and Tuttle, P.C.

(57) ABSTRACT

A locking device for two components of a height- and tilt-adjustable motor vehicle steering column, that has components that are displaceable in relation to one another, is disclosed. One component is fixed on a bracket stationarily connected to the body of the motor vehicle and the other component is part of a steering column housing accommodating the steering column, with at least two toothed surfaces each fixed on the components that are displaceable in relation to one another. The toothed surfaces have each at least one row of teeth with a plurality of teeth arranged next to one another. The free tips of the teeth of the two rows, which free tips face one another, are mutually repelled by magnetic forces.

18 Claims, 4 Drawing Sheets

US 6,390,717 B1

LOCKING DEVICE FOR A HEIGHT AND TILT ADJUSTABLE STEERING COLUMN IN A MOTOR VEHICLE

FIELD OF THE INVENTION

The present invention pertains to a locking device for two components of a height- and tilt-adjustable motor vehicle steering column. The components are displaceable relative to one another, wherein one component is fixed on a bracket stationarily connected to the body of the vehicle and the other component is part of a steering column housing accommodating the steering column, with at least two toothed surfaces, which are fixed on the components that are displaceable in relation to one another and can be brought into engagement with one another.

BACKGROUND OF THE INVENTION

Locking devices having the features of this type are used in the automobile industry in both passenger cars and trucks for the temporary fixation of a steering column. The fixation is set by the driver beforehand with respect to height and tilt corresponding to his personal needs. The fixation of the housing accommodating the steering column with the bracket that is a rigid part of the body is to be designed such that no relative movements will occur between the steering column housing and the body in the locked state of the device even in the case of an accident despite strong forces acting on the steering column, because such movements would compromise the function of air bag passenger protection systems which are now commonly used. Locking devices with positive-locking elements, especially with toothed racks designed as toothed surfaces which engage one another, offer a reliable and inexpensive possibility of providing the necessary holding forces. However, the use of pairs of toothed racks is associated with the system-inherent drawback that there are positions between the steering column housing and the bracket, that is a rigid part of the body, in which the toothed racks arranged on the respective components are in a "head-over-head" position in relation to one another. Even though the locking device can be fixed by the driver under certain circumstances in this special position, there is no real locking of the steering column housing and the bracket (i.e., that is a rigid part of the body) in relation to one another, so that a danger to the driver due to an uncontrolled relative movement between the components of the steering column in the case of an accident cannot be ruled out.

SUMMARY AND OBJECTS OF THE INVENTION

The object of the present invention is therefore to improve a locking device of this type such that the head-over-head position of the tooth heads in the toothed racks used in the locking devices is reliably ruled out under all circumstances.

This object is accomplished according to the present invention by the toothed surfaces each having at least one row of teeth with a plurality of teeth arranged next to one another, wherein the free tips of the teeth of two rows, which free tips face one another, are mutually repelled by magnetic forces.

It is achieved due to this design according to the present invention with a magnetic force free tip repulsion means that if two individual teeth of the toothed surfaces that are to be brought into engagement with one another stand one over the over, the teeth of one toothed rack will automatically slide off due to a lateral displacing movement into the spaces between the teeth of the opposite toothed rack, which opposite toothed rack is fixed on the stationary body bracket. A stable tooth-over-tooth position of the toothed racks or toothed surfaces located opposite one another is thus ruled out by the repulsion between the mutually opposite tooth tips, which repulsion is brought about by the magnetic forces.

Special embodiments of the subject of the present invention with locking device for two components of a height- and tilt-adjustable motor vehicle steering column having a magnetic force free tip repulsion means are described herein.

The tooth tips of the mutually opposite rows of teeth may have the same north or south polarity as needed, the only thing decisive for the function according to the present invention being that the tooth tips polarized in the same direction shall mutually repel one another due to the repulsive effect of magnet poles polarized in the same sense, which is known from magnetism.

In addition, it may be advantageous for the tooth bottoms located between the free tips of the two tooth rows, which free tips face one another, to have a polarity that is magnetically opposite to the polarity of the free tips of the teeth. The engagement effect of the two rows of teeth located one over another is supported by magnetic attracting forces due to this measure according to the present invention. This is due to the fact that after the mutually repelling tooth tips of the mutually opposite rows of teeth slide off into an adjacent tooth space, attracting forces between the tooth tips of opposite polarizations and the tooth bottoms located opposite them support the engagement effect of the two rows of teeth If the tooth tips of the rows of teeth have a magnetic north polarity, the opposite polarization with a south polarity leads to an attracting force of these opposite magnetic poles during the engagement of the rows of teeth.

Moreover, it may be useful to separate the functions of tooth engagement of the rows of teeth and the resulting provision of the required holding forces from the function of preventing the tooth heads from being located one over another in a simple and inexpensive manner within the framework of the separation of the functions. This can be accomplished according to the present invention in such a way that two magnetic strips provided with individual magnets are provided one over another adjacent to the tooth surfaces that can be brought into engagement with one another on the mobile component and on the stationary bracket for the steering column on the body, the individual magnets being arranged at spaced locations at a distance corresponding to half the tooth pitch of the teeth of the toothed racks, which said teeth are arranged next to one another, and the individual magnets being polarized in the same direction. This special embodiment of the subject of the present invention can be realized in a particularly inexpensive manner. The magnetic strips arranged next to the toothed racks may be equipped with commercially available small magnets. The only thing to be observed in arranging the individual magnets is that the individual magnets of the two mutually opposite magnetic strips shall be located with their equal polarization one over another at the moment at which the toothed racks are also in a head-over-head position. The individual magnets will repel one another in this position due to their equal polarization and thus bring about at the same time an offset of the toothed racks due to a lateral relative movement, so that a head-over-head position of the tooth tips is no longer given. The spaced arrangement of the individual magnets within the magnetic strips makes possible the engagement of the individual magnets just as well as the engagement of the rows of teeth during the locking operation, so that a reliable engagement of the teeth of the toothed racks with one another is guaranteed after the conclusion of the locking operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
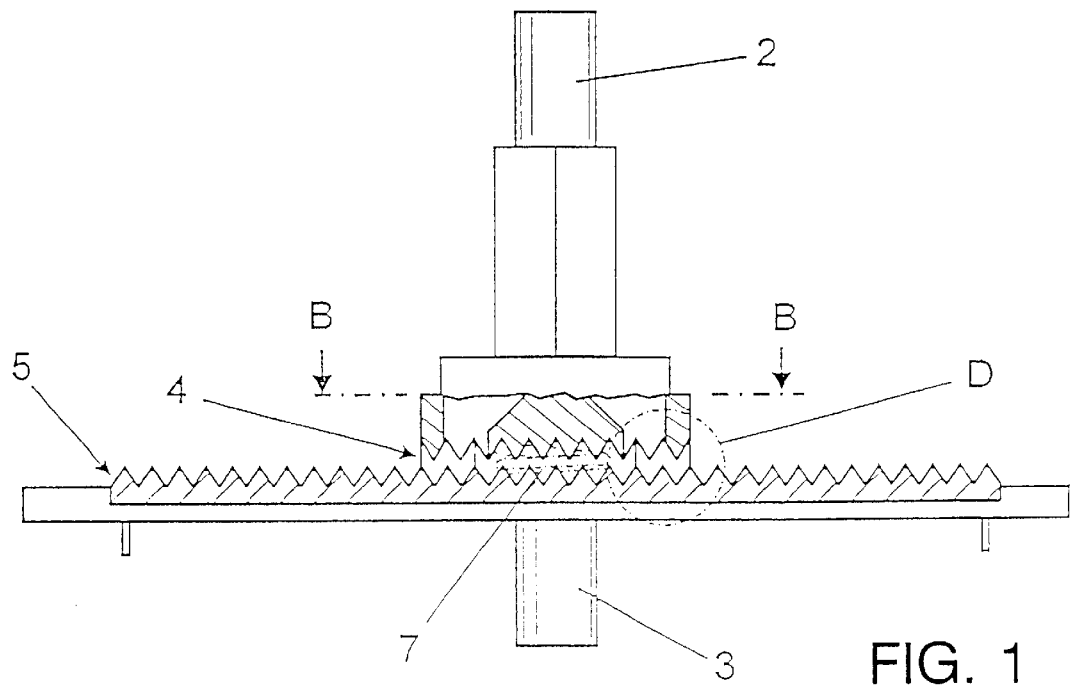
FIG. 1 is a side partially sectional view of a first exemplary embodiment of a locking device of the type according to the present invention.

Referring to the drawings in particular, the locking device according to the present invention shown in FIG. 1 has two components 2, 3 of a height- and tilt-adjustable motor vehicle steering column. These components are displaceable in relation to one another. Component 2 is fastened to the steering column housing, which is not shown in detail here, and which accommodates the adjustable motor vehicle steering column. Component 3 is arranged on a bracket of a motor vehicle, which said bracket is not shown in detail for the sake of clarity. Both components 2 and 3 have mutually opposite toothed surfaces 4 and 5, which can be brought into engagement with one another by a lever mechanism of the locking device. The lever mechanism itself is known from the state of the art. The engagement is such that a positive-locking rigid connection is established between the mobile steering column housing and the bracket (i.e., a rigid part of the body).

Figure 2:
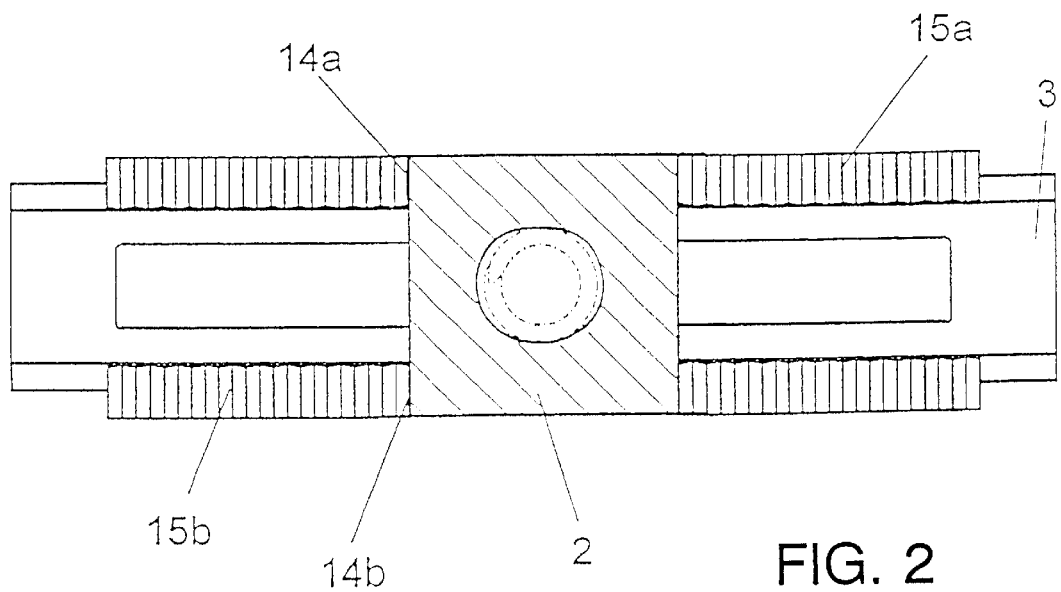
FIG. 2 is a sectional top view of the locking device from FIG. 1 corresponding to the sectional line BB from FIG. 1.
Figure 3A:
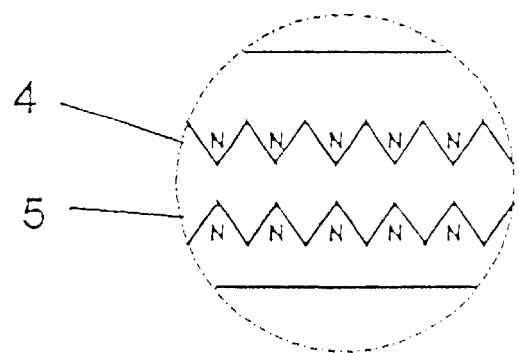
FIG. 3a is an enlarged side view of an embodiment variant of the opposite rows of teeth corresponding to detail D from FIG. 1.
Figure 3B:
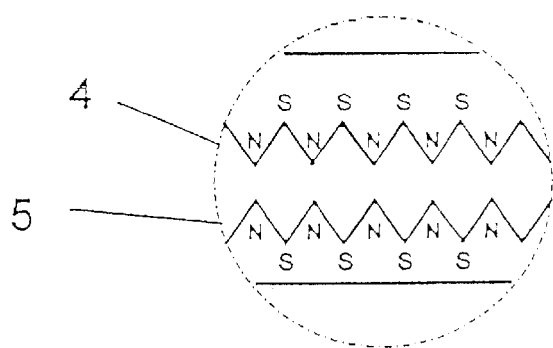
FIG. 3b is an enlarged side view of another embodiment variant of the opposite rows of teeth corresponding to detail D from FIG. 1.
Figure 4:
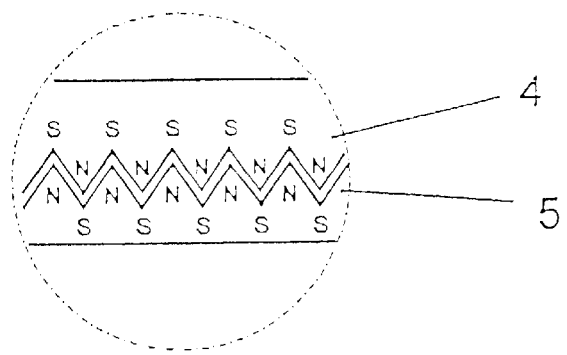
FIG. 4 is a detail view corresponding to detail D from FIG. 1 and the enlarged representation from FIG. 3b in the engaged state of the mutually opposite toothed racks.

As is clearly apparent from FIG. 2, the toothed surfaces 4 and 5 are formed from two rows of teeth 14a, 14b and 15a, 15b each. These rows of teeth have individual teeth located next to one another. The mutually opposite rows of teeth 14a, 14b, 15a, 15b are pushed apart by a spring element 7 in the form of a coil spring in the unlocked state. The case in which the individual teeth of the mutually opposite rows of teeth of the toothed surfaces 4 and 5 are located exactly one over another with their tooth tips may occur within the framework of the setting of the displaceable component 2 of the steering column in relation to the stationary bracket 3. Locking of the components 2 and 3 to provide corresponding holding forces is not possible in such a position. The embodiment according to the present invention for preventing such a situation provides for the tooth tips of the individual teeth to have equal polarity. This is schematically shown in FIG. 3a, in which the individual tooth tips are designated by the symbol N indicating a magnetic north polarization. The tooth tips are mutually repelled according to the present invention by the magnetic repulsive forces of equal magnet poles, which causes the mobile toothed surface 4 of component 2 to slide into the spaces between the teeth of the fixed toothed surface 5 of component 3 already when the rows of teeth are approaching one another within the framework of the locking operation. This introduction effect of the tooth tips of one toothed surface into the spaces between the teeth of the opposite toothed surface can be additionally supported by the measure of providing the tooth bottoms located between the individual teeth with a magnetic polarity that is opposite the polarity of the tooth tips. Such an embodiment is schematically shown in FIGS. 3b and 4. As is apparent from these figures, the tooth tips each have a magnetic north orientation, whereas the tooth bottoms located between them are provided with a magnetic south polarity. The equal polarity of the tooth tips leads, analogously to FIG. 3a to a repulsive effect of the tooth tips among each other. This repulsive effect automatically leads to an offset arrangement of the mutually opposite toothed surfaces 4 and 5, so that the engagement of the individual teeth is possible. While the toothed surfaces slide into one another, the engagement effect is supported by the magnetic attractive force between the magnetic north polarization of the tooth tips and the tooth bottoms, which are provided, in contrast, with a south polarity. The toothed surfaces 4 and 5 are shown in FIG. 4 in their engaged position, in which the attractive force between the south and north polarities of the tooth bottoms and tooth tips is inherently the strongest.

Figure 5:
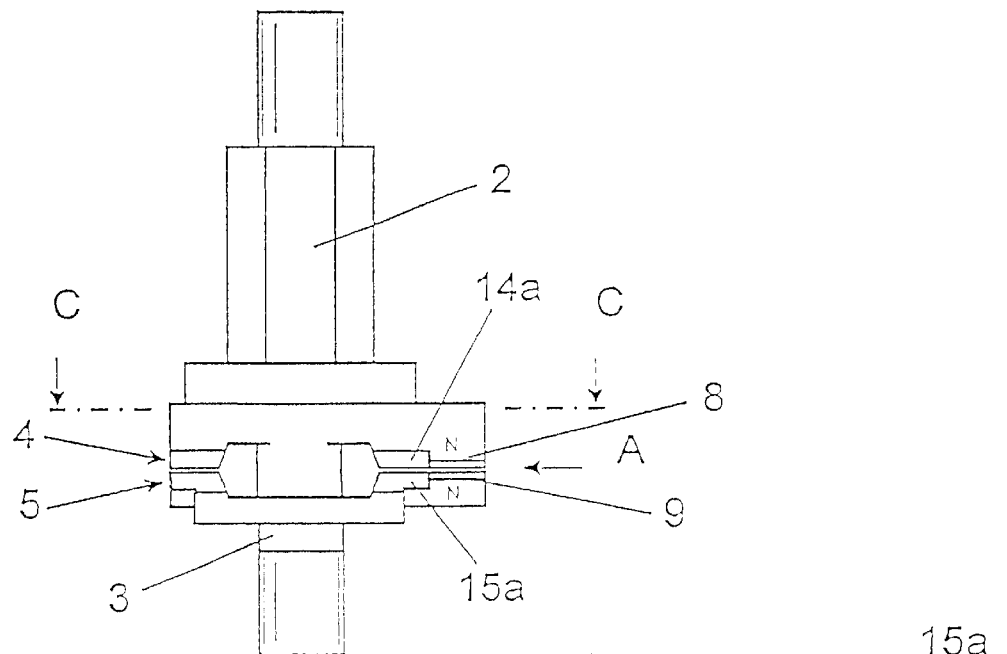
FIG. 5 is a side view of a second embodiment variant of the locking device according to the present invention.
Figure 6:
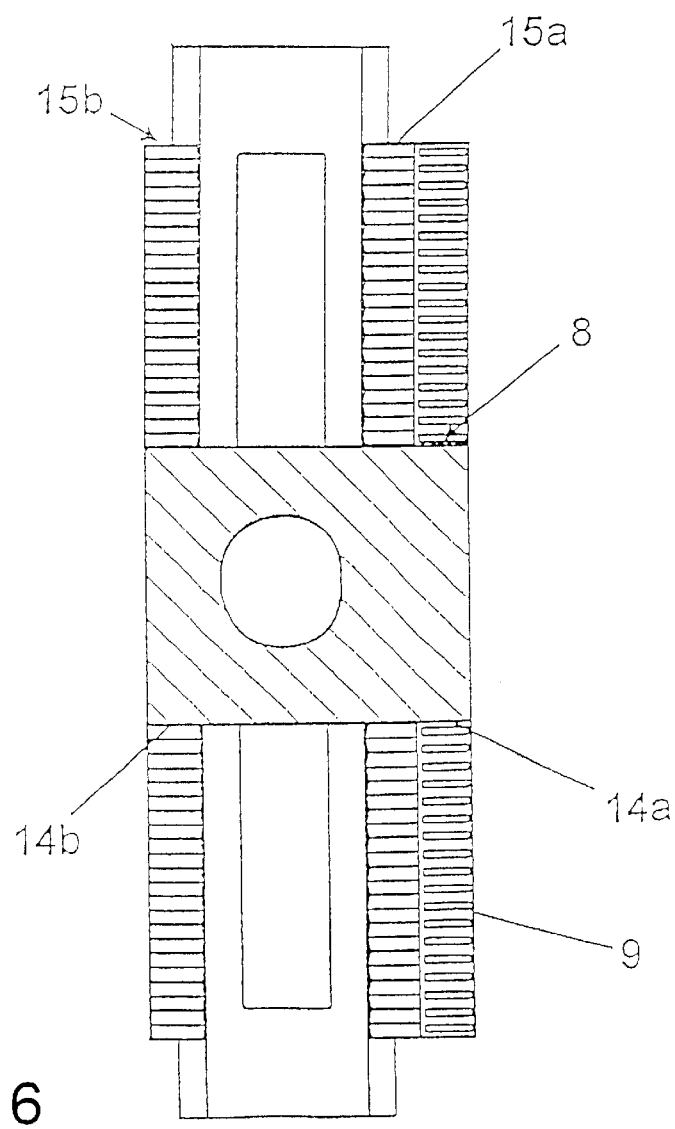
FIG. 6 is a sectional top view corresponding to line CC from FIG. 5.
Figure 7A:
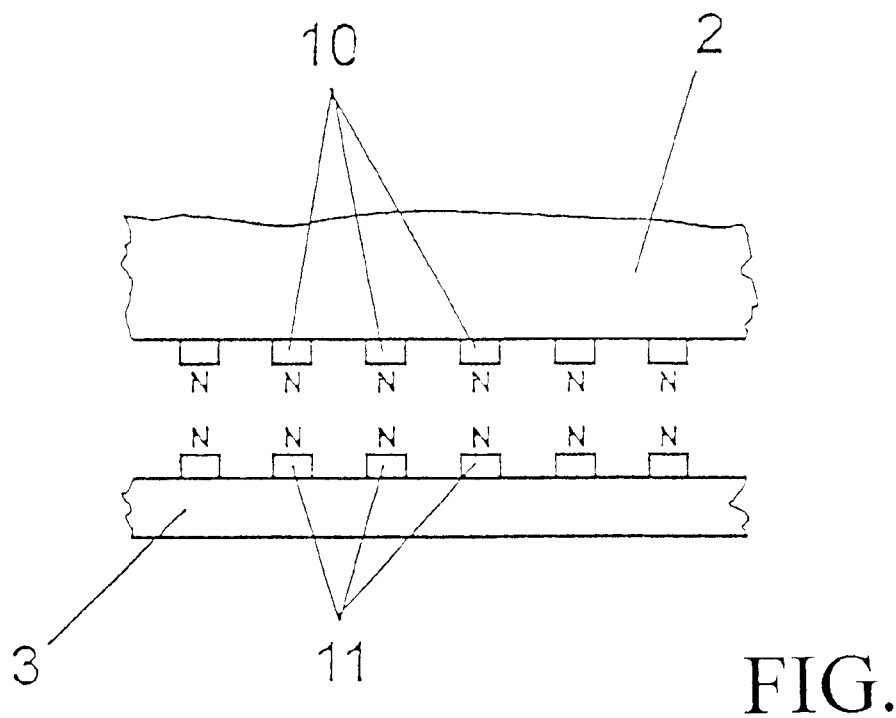
FIG. 7a is a front view of the locking device from FIG. 5 corresponding to arrow A in the unlocked state.
Figure 7B:
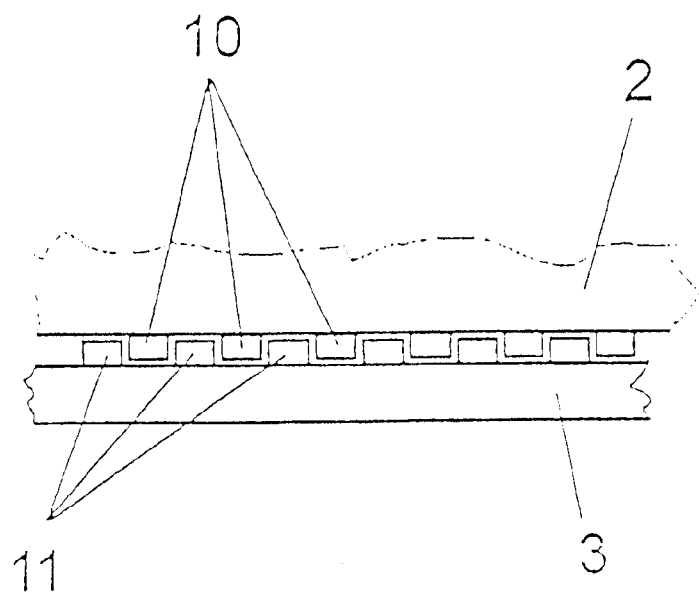
FIG. 7b is a front view of the locking device from FIG. 5 corresponding to arrow A in the locked state.

FIGS. 5–7 show another embodiment variant of the subject of the present invention. The same reference numbers are used for the components of both embodiment variant if the components of the second embodiment variant correspond to those of the embodiment variants according to FIGS. 1–5.

Corresponding to embodiment variant 1, the locking device in FIG. 5 likewise has a toothed surface 4 on the mobile component 2 of a motor vehicle steering column. The toothed surface 5 is located on component 3, which is a rigid part of the body and is usually designed as a steering column bracket. The toothed surfaces 4 and 5 are in turn divided into two rows of teeth 14a, 14b and 15a, 15b, which are arranged next to one another and can be brought into engagement with one another by means of an actuating device known from the state of the art.

As is clearly apparent from FIGS. 5 and 6, two magnetic strips 8 and 9 are located adjacent to the rows of teeth 14a and 15a, the magnetic strip 8 being rigidly connected to the mobile component 2, whereas the magnetic strip 9 is fixed to the component 3 that is a rigid part of the body. Both magnetic strips 8 and 9 have individual magnets 10 and 11 arranged at spaced locations from one another, as is apparent from FIGS. 7a and 7b. The individual magnets 10 and 11 consist of commercially available, elongated magnets, the undersides of the magnets 10 belonging to component 2 being provided with north polarity, whereas the top sides of the individual magnets 11 of the magnetic strip 9, which belongs to the fixed, body-side component 3, where the top sides face the undersides of the magnets 10, likewise have a magnetic north polarity. The distance between the individual magnets 10 and 11 of the magnetic strips 8 and 9 is selected to be such that it corresponds to half the pitch of teeth of the toothed racks 15a and 14a, which the teeth are arranged next to one another.

If the case occurs within the framework of the setting of the displaceable motor vehicle steering column in which the toothed surfaces 4 and 5 that are to be brought into engagement with one another are located such in relation to one another that the corresponding teeth assume a so-called head-over-head position, the adjacent magnetic strips with their individual magnets 10 and 11 will also be located directly one over the other. The repulsion of the respective magnetic north polarities of the magnetic strips 8 and 9 located one over the other causes the mobile component 2 to be laterally displaced in relation to the component 3 fixed to the body such that the existing head-over-head position of the corresponding rows of teeth 4 and 5 will be eliminated. The rows of teeth located one over another can thus slide into one another, and the sliding into one another of the magnetic strips 8 and 9 is also possible at the same time due to the spaced arrangement of the individual magnets 10 and 11. The locked position of the locking means according to the present invention, in which the two toothed surfaces 4 and 5 are connected to one another in a positive-locking manner, is shown for illustration in FIG. 7b.

The magnetic forces provided in different designs in the exemplary embodiments 1 and 2 thus avoid the head-over-head position of the corresponding toothed surfaces, which is possible under certain circumstances in the locking devices usually used currently, in a simple and reliable manner. The individual magnets used in exemplary embodiment 2 represent an especially advantageous embodiment variant of the subject of the present invention especially from production technological and economic viewpoints.

While specific embodiments of the invention have been shown and described in detail to illustrate the application of the principles of the invention, it will be understood that the invention may be embodied otherwise without departing from such principles.

What is claimed is:

1. A locking device for two components of a height-adjustable and tilt-adjustable motor vehicle steering column, the components being displaceable in relation to one another with one component being fixed on a bracket stationarily connected to a body of a motor vehicle and the other component being part of a steering column housing accommodating the steering column, the locking device comprising:

a first toothed surface fixed to one component;
   a second toothed surface fixed to the other component, the first toothed surface and the second toothed surface each having at least one row of teeth with a plurality of teeth arranged next to one another, the second toothed surface being brought into engagement with first toothed surface wherein free tips of the teeth of the two rows, which free tips face one another, are mutually repelled by magnetic forces.

2. A locking device in accordance with claim 1, wherein the free tips of the teeth of the two rows, which tips face one another, have equal magnetic north polarity.

3. A locking device in accordance with claim 2, wherein the teeth of the two rows include tooth bottoms located between the tips of the teeth of the two rows, which tips face one another, said tooth bottoms having a magnetic polarity that is opposite the polarity of the free tips of the teeth.

4. A locking device in accordance with claim 1, wherein the free tips of the teeth of the two rows, which tips face one another, have equal magnetic south polarity.

5. A locking device in accordance with claim 4, wherein the teeth of the two rows include tooth bottoms located between the tips of the teeth of the two rows, which tips face one another, have a magnetic polarity that is opposite the polarity of the free tips of the teeth.

6. A locking device in accordance with claim 1, wherein the free tips of the teeth of the two rows, which tips face one another, have equal magnetic north polarity and the teeth of the two rows include tooth bottoms tooth bottoms arranged between the tips, the tooth bottoms having equal south polarity.

7. A locking device in accordance with claim 1, wherein the free tips of the teeth of the two rows, which tips face one another, each have equal magnetic south polarity and the teeth of the two rows include tooth bottoms, the tooth bottoms being arranged between the tips each have equal north polarity.

8. A locking device in accordance with claim 1, wherein two magnetic strips provided with individual magnets are provided one over another adjacent to the toothed surfaces, on each of the components that are displaceable in relation to one another, the components displaceable in relation to one another include a mobile component and a stationary bracket respectively, the toothed surfaces being brought into engagement with one another, wherein the individual magnets are arranged at spaced locations at a distance corresponding to half a tooth pitch of the teeth arranged next to one another and wherein individual segments have equal polarization.

9. A locking device for two components of a height-adjustable and tilt-adjustable motor vehicle steering column, the components being displaceable in relation to one another with one component being fixed on a bracket stationarily connected to a body of a motor vehicle and the other component being part of a steering column housing accommodating the steering column, the locking device comprising:

a first toothed surface fixed to one component;
   a second toothed surface fixed to the other component, the first toothed surface and the second toothed surface each having at least one row of teeth with a plurality of teeth arranged next to one another, the second toothed surface being brought into engagement with first toothed surface;
   magnetic forces associated with said toothed surfaces for mutually repelling facing free tips of the teeth of the two rows.

10. A locking device in accordance with claim 9, wherein said magnetic forces are provided by said free tips of the teeth of the two rows being magnetic, which tips face one another, having equal magnetic north polarity.

11. A locking device in accordance with claim 10, wherein the teeth of the two rows include tooth bottoms, located between said free tips of the teeth of the two rows, which tips face one another, have a magnetic polarity that is opposite the polarity of the free tips of the teeth.

12. A locking device in accordance with claim 9, wherein the magnetic forces are provided by said free tips of the teeth of the two rows, which tips face one another, having equal magnetic south polarity.

13. A locking device in accordance with claim 12, wherein the teeth of the two rows include tooth bottoms located between the tips of the teeth of the two rows, which tips face one another, have a magnetic polarity that is opposite the polarity of the free tips of the teeth.

14. A locking device in accordance with claim 9, wherein magnetic forces are provided by said free tips of the teeth of the two rows, which tips face one another, have equal magnetic north polarity and the teeth of the two rows include tooth bottoms arranged between the tips having equal south polarity.

15. A locking device in accordance with claim 9, wherein magnetic forces are provided by said free tips of the teeth of the two rows, which tips face one another, each having equal magnetic south polarity and the teeth of the two rows include tooth bottoms arranged between the tips each having equal north polarity.

16. A locking device in accordance with claim 9, wherein magnetic forces are provided by two magnetic strips provided with individual magnets, one magnet strip over another with each of said magnet strips being connected to a respective one of the components, each of said magnet strips being adjacent to the toothed surfaces.

17. A locking device in accordance with claim 16, wherein the teeth of the two rows include tooth bottoms arranged between the free tips and wherein individual magnets arranged next to one another of each of the magnetic strips are arranged at spaced locations at a distance corresponding to half a tooth pitch of the teeth arranged next to one another with segments corresponding to the free tips of the teeth of the two rows and segments corresponding to the tooth bottoms having equal polarization.

18. A locking device and height-adjustable and tilt-adjustable motor vehicle steering column component combination, the combination comprising:

a fixed component fixed on a bracket stationarily connected to a body of a motor vehicle;

a movable component displaceable in relation to said fixed component, said movable component being part of a steering column housing accommodating the steering column; and a locking device including a first toothed surface fixed to said fixed component, a second toothed surface fixed to said movable component, said first toothed surface and said second toothed surface each having at least one row of teeth with a plurality of teeth arranged next to one another, said second toothed surface being brought into engagement with first toothed surface and with magnetic forces associated with said toothed surfaces for mutually repelling facing free tips of the teeth.

* * * * *